United States Patent
Chou et al.

(10) Patent No.: US 11,572,639 B2
(45) Date of Patent: Feb. 7, 2023

(54) FIBER MASTERBATCH AND MELT SPUN FIBER

(71) Applicant: Taiwan Textile Research Institute, New Taipei (TW)

(72) Inventors: Shang-Chih Chou, New Taipei (TW); Shao-Yen Chang, New Taipei (TW); Chun-Hung Lin, New Taipei (TW); Yuan-Pei Liao, New Taipei (TW); Yi-Cang Lai, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 305 days.

(21) Appl. No.: 17/035,765

(22) Filed: Sep. 29, 2020

(65) Prior Publication Data

US 2021/0301426 A1 Sep. 30, 2021

Related U.S. Application Data

(60) Provisional application No. 63/003,243, filed on Mar. 31, 2020.

(30) Foreign Application Priority Data

Jul. 22, 2020 (TW) .................................. 109124673

(51) Int. Cl.
| | | |
|---|---|---|
| *D01F 8/14* | (2006.01) | |
| *C08L 67/02* | (2006.01) | |
| *C08L 79/08* | (2006.01) | |
| *D01F 8/16* | (2006.01) | |

(52) U.S. Cl.
CPC ................ *D01F 8/14* (2013.01); *C08L 67/02* (2013.01); *C08L 79/08* (2013.01); *D01F 8/16* (2013.01); *C08L 2203/12* (2013.01); *C08L 2205/025* (2013.01); *C08L 2205/03* (2013.01); *C08L 2310/00* (2013.01)

(58) Field of Classification Search
CPC ...... C08L 67/02; C08L 79/08; C08L 2203/12; C08L 2205/025; C08L 2205/03; C08L 2310/00; D01F 8/14; D01F 8/16
See application file for complete search history.

(56) References Cited

U.S. PATENT DOCUMENTS

| | | | | |
|---|---|---|---|---|
| 6,114,472 | A * | 9/2000 | Matsuki ................. | C08L 67/02 525/425 |
| 2008/0119616 | A1* | 5/2008 | Donovan ................ | C08L 79/08 525/432 |

FOREIGN PATENT DOCUMENTS

| | | |
|---|---|---|
| TW | I571493 | 2/2017 |
| TW | 202009258 | 3/2020 |
| WO | 2009047466 | 4/2009 |

OTHER PUBLICATIONS

"Notice of Allowance of Taiwan Counterpart Application," dated Nov. 24, 2021, pp. 1-4.

* cited by examiner

*Primary Examiner* — James C Goloboy
(74) *Attorney, Agent, or Firm* — JCIPRNET

(57) ABSTRACT

A fiber masterbatch including a polyetherimide, a polyethylene terephthalate, and a polyimide is provided. A glass transition temperature of the polyimide is between 140° C. and 170° C., a 10% thermogravimetric loss temperature of the polyimide is between 500° C. and 550° C., and when the polyimide is dissolved in N-methyl-2-pyrrolidone and a solid content of the polyimide is 15 wt %, a viscosity of the polyimide is between 80 cP and 230 cP. A melt spun fiber obtained by using the fiber masterbatch is also provided.

10 Claims, No Drawings

FIBER MASTERBATCH AND MELT SPUN FIBER

CROSS-REFERENCE TO RELATED APPLICATION

This application claims the priority benefit of U.S. provisional application Ser. No. 63/003,243, filed on Mar. 31, 2020, and Taiwan application serial no. 109124673, filed on Jul. 22, 2020. The entirety of each of the above-mentioned patent applications is hereby incorporated by reference herein and made a part of this specification.

BACKGROUND

Technical Field

The present invention relates to a textile material, and in particular to a fiber masterbatch for melt-spinning process and a melt spun fiber made from it.

Description of Related Art

Many thermoplastic resins called "engineering plastics" have been widely used in various fields due to their excellent heat resistance, chemical resistance, flame retardancy and the like. However, the engineering plastics are still limited in their use. For example, the working temperature of polyetherimide is quite high (between 350° C. and 380° C.), which is not easy to achieve for a general machine. Furthermore, when poly(vinylidene fluoride) is subjected to high-temperature molding, if the processing temperature is equal to or greater than 320° C., hydrofluoric acid having strong corrosivity is likely to generate. Therefore, how to improve the applicability of engineering plastics is still an important topic for active research.

SUMMARY

The present invention provides a fiber masterbatch, which has good melt processability, appropriate melt processing temperature, good flexibility, good flame retardancy, good heat resistance, and no dripping phenomenon after combustion, and is suitable for textiles.

The present invention provides a melt spun fiber, which has good flexibility, good flame retardancy, good heat resistance, low processing temperature, and no dripping phenomenon after combustion.

The fiber masterbatch of the present invention includes a polyetherimide (PEI), a polyethylene terephthalate (PET), and a polyimide, wherein the glass transition temperature of the polyimide is between 140° C. and 170° C., the 10% thermogravimetric loss temperature of the polyimide is between 500° C. and 550° C., and when the polyimide is dissolved in N-methyl-2-pyrrolidone (NMP) and the solid content of the polyimide is 15 wt %, the viscosity of the polyimide is between 80 cP and 230 cP.

The melt spun fiber of the present invention is obtained by using the fiber masterbatch as described above.

Based on the above, the fiber masterbatch of the present invention includes the polyetherimide, the polyethylene terephthalate and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP, whereby the fiber masterbatch has good melt processability, appropriate melt processing temperature, good flexibility, good heat resistance, good flame retardancy, and no dripping phenomenon after combustion, and is suitable for textiles. Further, the melt spun fiber of the present invention is manufactured from the aforementioned fiber masterbatch, whereby the melt spun fiber has good flexibility, good heat resistance, good flame retardancy, low processing temperature, and no dripping phenomenon after combustion.

In order to make the above-mentioned features and advantages of the present invention more comprehensible, embodiments are illustrated in detail hereinafter.

DESCRIPTION OF THE EMBODIMENTS

Herein, a range represented by being from a value to another value is a schematic representative manner of preventing all values within the range from being listed one by one in the specification. Therefore, a record of a particular value range covers any value within the value range and a smaller value range defined by any value within the value range, like a case in which the any value and the smaller value range are explicitly written in the specification.

Herein, the structure of a polymer or a group is sometimes represented by a skeleton formula. Carbon atoms, hydrogen atoms, and carbon-hydrogen bonds can be omitted in this representation. Certainly, if an atom or an atomic group is definitely drawn in a structural formula, the drawn atom or atomic group prevails.

As used herein, "about", "approximately", "essentially" or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", "essentially" or "substantially" may depend on measurement properties or other properties to select a more acceptable range of deviations or standard deviations without one standard deviation for all properties.

In order to provide a fiber masterbatch that has good melt processability, appropriate melt processing temperature, good flexibility, good flame retardancy, and no dripping phenomenon after combustion, and is suitable for making a melt spun fiber, the present invention provides a fiber masterbatch, which can achieve the above advantages. In the following, embodiments are listed as examples in which the present invention can be actually implemented accordingly.

An embodiment of the present invention provides a fiber masterbatch including a polyetherimide (PEI), a polyethylene terephthalate (PET), and a polyimide (PI). Hereinafter, the above components will be explained in detail.

The polyetherimide is a thermoplastic non-crystalline polymer with solvent-soluble properties. In the present embodiment, the polyetherimide may include a repeating unit represented by the following Formula I:

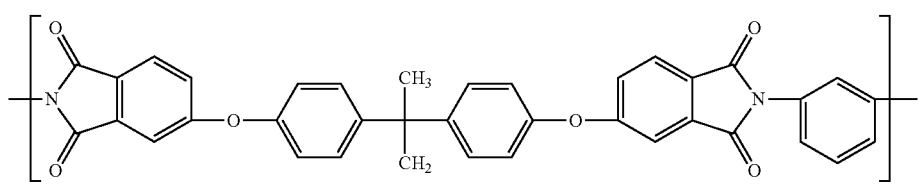

Formula I

In other words, the polyetherimide may be obtained by reacting 4,4'-(4,4'-isopropylidenediphenoxy)bis(phthalic anhydride) (BPADA) with m-phenylenediamine (m-PDA). In addition, in the present embodiment, the polyetherimide may be a commercially available product or a recovered powder (i.e., a secondary material), wherein the commercially available product is, for example, spinning-grade ULTEM 9011 PEI and ULTEM 1010 PEI manufactured by Saudi Basic Industries Corporation (Sabic). When the polyetherimide is a secondary material, there is the advantage in reducing costs. In the present embodiment, the weight average molecular weight (Mw) of the polyetherimide may be between about 44,000 g/mol to about 50,000 g/mol. In addition, the polyetherimide inherently has no dripping phenomenon after combustion, good heat resistance and dyeability, so the fiber masterbatch of which the material includes the polyetherimide has no dripping phenomenon after combustion, good heat resistance and dyeability.

In the present embodiment, the polyethylene terephthalate may be a commercially available product or a recovered powder (i.e., a secondary material), wherein the commercially available product is, for example, PET U25961 provided by SHINKONG Co., Ltd. or PET 3802 provided by NAN YA PLASTIC Co., Ltd. When the polyethylene terephthalate is a secondary material, there is the advantage in reducing costs. In the present embodiment, the weight average molecular weight (Mw) of the polyethylene terephthalate may be between about 20,000 g/mol to about 30,000 g/mol.

In the present embodiment, the glass transition temperature of the polyimide is between about 140° C. and about 170° C., and the 10% thermogravimetric loss temperature of the polyimide is between about 500° C. and about 550° C., and when the polyimide is dissolved in NMP and the solid content of the polyimide is about 15 wt %, the viscosity of the polyimide is between about 80 cP and about 230 cP. If the glass transition temperature, the 10% thermogravimetric loss temperature and the viscosity of the polyimide do not fall within the above ranges, the fiber masterbatch has poor melt processability and poor thermal stability.

In the present embodiment, the polyimide is an ether group-containing polyimide, which can improve the melt processability of the fiber masterbatch. In the present embodiment, the polyimide may include a repeating unit represented by Formula 1:

Formula 1

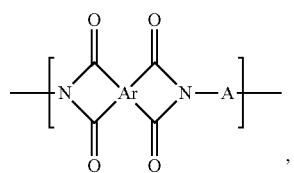

wherein Ar is a tetravalent organic group derived from a tetracarboxylic dianhydride compound containing aromatic group, and A is a divalent organic group derived from a diamine compound containing aromatic group. That is to say, Ar is the residue in the tetracarboxylic dianhydride compound containing aromatic group other than two carboxylic anhydride groups (—(CO)$_2$O); and A is the residue in the diamine compound containing aromatic group other than amino groups (—NH$_2$). In the present embodiment, at least one of the tetravalent organic group and the divalent organic group contains ether group. That is, at least one of the tetracarboxylic dianhydride compound containing aromatic group and the diamine compound containing aromatic group contains ether group. Herein, the tetracarboxylic dianhydride compound containing aromatic group is also referred to as a dianhydride monomer, and the diamine compound containing aromatic group is also referred to as a diamine monomer.

In the present embodiment, the polyimide is obtained by reacting the dianhydride monomer with the diamine monomer.

In the present embodiment, Ar may be

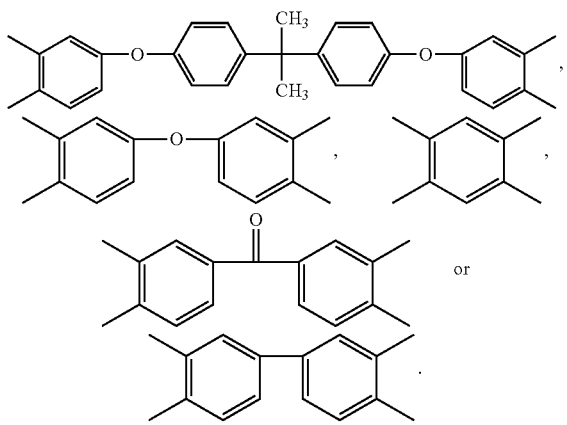

Specifically, the dianhydride monomer used for preparing the polyimide may be 4,4'-(4,4'-isopropylidenediphenoxy)bis(phthalic anhydride) (BPADA), oxydiphthalic anhydride (ODPA), pyromellitic dianhydride (PMDA), 3,3',4,4'-benzophenonetetracarboxylic dianhydride (BTDA), or 3,3',4,4'-biphenyltetracarboxylic dianhydride (BPDA).

In the present embodiment, A may be

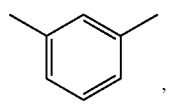

-continued

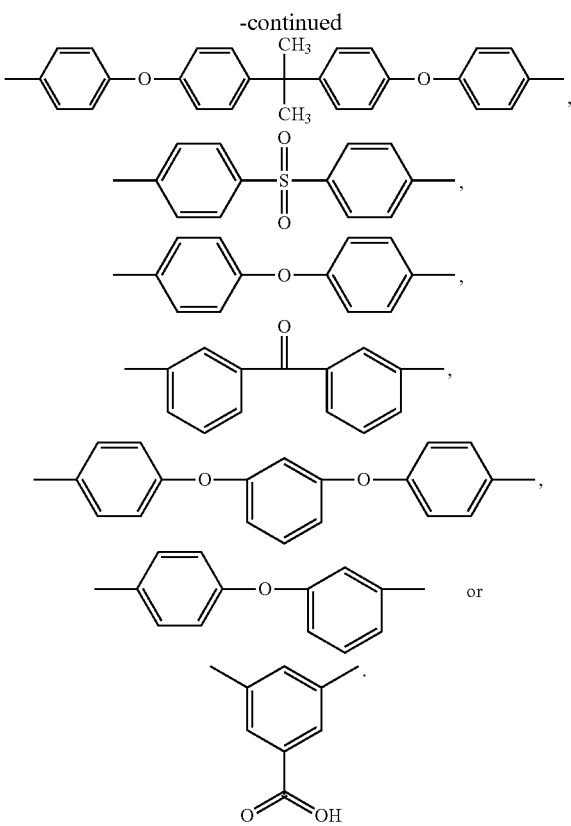

Specifically, the diamine monomer used to prepare the polyimide may be meta-phenylene diamine (m-PDA), 2,2-bis[(4-aminophenoxy) phenyl]propane (BAPP), 4,4'-diaminodiphenyl sulfone, 4,4'-oxydianiline (or 4,4'-diaminodiphenyl ether; ODA), 3,3'-diaminobenzophenone, 1,3-bis (4-aminophenoxy)benzene (TPE-R), 3,4'-oxydianiline (or 3,4'-diaminodiphenyl ether), or 3,5-diaminobenzoic acid (DABA).

In detail, in the present embodiment, the polyimide may be prepared, for example, by a polycondensation reaction and a thermal cyclization method, or by a polycondensation reaction and a chemical cyclization method. The polycondensation reaction, the thermal cyclization method, and the chemical cyclization method can each be carried out by any step known to those skilled in the art. In one embodiment, the preparation of the polyimide by a polycondensation reaction and a chemical cyclization method may include the steps of: subjecting a dianhydride monomer and a diamine monomer to a polycondensation reaction in a solvent to form a poly(amic acid) solution, and then adding a dehydrating agent and an imidizing agent to the poly(amic acid) solution to undergo an imidization reaction (i.e., a dehydration-cyclization reaction) to form the polyimide. In another embodiment, the preparation of the polyimide by a polycondensation reaction and a thermal cyclization method may include the steps of: subjecting a dianhydride monomer and a diamine monomer to a polycondensation reaction in a solvent to form a poly(amic acid) solution, and then heating the poly(amic acid) solution to undergo an imidization reaction (i.e., a dehydration-cyclization reaction) to form the polyimide.

The solvent is not particularly limited as long as it can dissolve the dianhydride monomer and the diamine monomer. Specifically, the solvent includes, for example, but is not limited to, an amide-based solvent (such as N,N-dimethylacetamide (DMAc), N,N-dimethylformamide (DMF), N,N'-diethylacetamide, NMP, γ-butyrolactone, or hexamethylphosphoramide); a urea-based solvent (such as tetramethylurea or N,N-dimethylethylurea); an sulfoxide or sulfone-based solvent (such as dimethyl sulfoxide (DMSO), diphenyl sulfone or tetramethyl sulfone); a halogenated alkyl-based solvent (such as chloroform or dichloromethane); an aromatic hydrocarbon-based solvent (such as benzene or toluene); a phenol-based solvent (such as phenol or cresol); or an ether-based solvent (such as tetrahydrofuran (THF), 1,3-dioxolane, dimethyl ether, diethyl ether or p-cresol methyl ether). The above solvents may be used alone or in combination. In order to improve the solubility and reactivity of the diamine monomer and the dianhydride monomer, the solvent is preferably an amide-based solvent, such as DMAc, DMF, and NMP. Further, the dehydrating agent includes, for example, but is not limited to, acetic anhydride, propionic anhydride, n-butyric anhydride, benzoic anhydride, or trifluoroacetic anhydride; the imidizing agent includes, for example, but is not limited to, pyridine, picoline, quinoline, or isoquinoline.

In addition, in the present embodiment, the kind number of the diamine monomer and the kind number of the dianhydride monomer used to prepare the polyimide are not limited, as long as the prepared polyimide has the glass transition temperature of about 140° C. to about 170° C., the 10% thermogravimetric loss temperature of about 500° C. to about 550° C., and the viscosity of about 80 cP to about 230 cP when the polyimide is dissolved in NMP and the solid content is 15 wt %, and has the characteristics of proper melt processability and solvent solubility. For example, the polyimide may be obtained by reacting one kind of diamine monomer with one kind of dianhydride monomer. For another example, the polyimide may be obtained by reacting kinds of diamine monomers with one kind of dianhydride monomer, reacting one kind of diamine monomer with kinds of dianhydride monomers, or reacting kinds of diamine monomers with kinds of dianhydride monomers.

In the present embodiment, the manufacturing method of the fiber masterbatch may include: sequentially performing a mixing and dispersion process and a blending and granulating process on the polyetherimide, the polyethylene terephthalate and the polyimide. In one embodiment, the mixing and dispersion process is, for example, carried out at room temperature and the processing temperature used in the blending and granulating process is, for example, between about 310° C. and about 330° C.

In some embodiments, in the fiber masterbatch, the content of the polyetherimide is greater than or equal to about 25 parts by weight and less than or equal to about 80 parts by weight, the content of the polyethylene terephthalate is greater than or equal to about 20 parts by weight and less than or equal to about 70 parts by weight, and the content of the polyimide is from about 1 part by weight to about 5 parts by weight. If the polyetherimide is used in an amount of less than about 25 parts by weight, the heat resistance and the flame retardancy of the fiber masterbatch are not good, and the fiber masterbatch easily has the dripping phenomenon after combustion; if the polyetherimide is used in an amount of greater than 80 parts by weight, the melt processability of the fiber masterbatch is not good, and the melt processing temperature is too high to easily produce the melt spun fiber. On the other hand, if the polyethylene terephthalate is used in an amount of less than about 20 parts by weight, the melt processability of the fiber masterbatch is not good; if the polyethylene terephthalate is used in an amount of greater than about 70 parts by weight, the heat resistance and the flame retardancy of the fiber masterbatch is poor. If the polyimide is used in an amount of less than about 1 part by weight or greater than about 5 parts by weight, the polyetherimide is not easily compatible with the polyethylene terephthalate, and thus the fiber masterbatch is not easily to be made.

In addition, in some embodiments, the fiber masterbatch has a melt index (MI) of from about 70 g/10 min to about 150 g/10 min at about 320° C. Generally, the processing temperature of the polyetherimide is between 350° C. and 380° C. In view of this, the fiber masterbatch including the polyetherimide, the polyethylene terephthalate, and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP has good melt processability and reduced melt processing temperature.

In addition, in some embodiments, the fiber masterbatch has a glass transition temperature (Tg) between about 100° C. and about 170° C. In comparison, the glass transition temperature of the polyetherimide is usually about 214° C. Therefore, the fiber masterbatch including the polyetherimide, the polyethylene terephthalate, and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP has good flexibility. It is worth mentioning that the fiber masterbatch is a material with good flexibility, so the fiber masterbatch can be applied to textiles, and when applied to textiles, the fiber masterbatch may be processed into the form of fiber or film.

In addition, within the scope of not compromising the essential effect of the fiber masterbatch, the fiber masterbatch may be blended with an additive as required to further increase the applicability and commercial value of the fiber masterbatch. The additive includes, for example, a flame retardant, an antistatic agent, an antibacterial agent, a colorant or combinations thereof.

It is worth noting that, in the present embodiment, the fiber masterbatch includes the polyetherimide, the polyethylene terephthalate, and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP, thereby the fiber masterbatch can have good melt processability, proper melt processing temperature, good flexibility, good heat resistance, good flame retardancy, and no dripping phenomenon after combustion, and is suitable for textiles. In addition, because the fiber masterbatch can have good flexibility, good heat resistance, good flame retardancy, and no dripping phenomenon after combustion, the fiber masterbatch cannot easily cause brittleness or breakage after high temperature treatment. As a result, the fiber masterbatch and the fibers made by the said fiber masterbatch have greatly improved applicability and commercial value in the textile industry. For example, the fibers made by the said fiber masterbatch can be used to produce textiles with good heat resistance, good flame retardancy and good lifetime, such as fire-fighting clothes, thermal insulation gloves, fireproof blankets.

In addition, as mentioned above, the fiber masterbatch of the present invention can be in the form of fiber or film. In the following, the fiber masterbatch being in the form of fiber is taken as an example for description.

Another embodiment of the present invention provides a melt spun fiber, which is made by using a fiber masterbatch according to any one of the above embodiments. In other words, the material of the melt spun fiber includes the polyetherimide, the polyethylene terephthalate, and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP.

In some embodiments, the melt spun fiber is pre-oriented yarn (POY; also known as partially oriented yarn). In an embodiment where the melt spun fiber is a pre-oriented yarn, the preparation method of the melt spun fiber includes, for example, drying the fiber masterbatch to remove moisture, and then performing a melt-spinning process on the dried fiber masterbatch, wherein the temperature for drying the fiber masterbatch is, for example, between about 120° C. and about 140° C., the time for drying the fiber masterbatch is, for example, about 12 hours or more, the melt-spinning temperature is, for example, between about 320° C. and about 350° C., and the winding speed is, for example, between about 700 m/min and about 1000 m/min.

In other embodiments, the melt spun fiber is a fully oriented yarn (FOY). In an embodiment where the melt spun fiber is a fully oriented yarn, the preparation method of the melt spun fiber includes, for example, the following steps. First, referring to the above method, the fiber masterbatch is subjected to a melt-spinning process to form a pre-oriented yarn (partially oriented yarn). Next, a thermal stretching process is performed on the said pre-oriented yarn (partially oriented yarn) by using, for example, a hot roll stretching machine or a thermal stretching braiding machine, wherein the thermal stretching temperature is, for example, between about 70° C. and about 120° C., and the thermal stretching ratio is, for example, between about 20% and about 60%.

As mentioned above, in the present embodiment, the melt-spinning temperature of the melt spun fiber may be between about 320° C. and about 350° C. Generally, the melt-spinning temperature of the polyetherimide is greater than about 380° C. In view of this, the melt spun fiber made by using a fiber masterbatch according to any one of the above embodiments is manufactured at a reduced melt-spinning temperature, and thus the melt spun fiber has good applicability. In other words, the fiber masterbatch has good melt processability and reduced melt processing temperature.

In the present embodiment, the fiber fineness of the melt spun fiber may be between about 50 d/96 f and about 220 d/48 f. That is to say, in the present embodiment, a fiber masterbatch according to any one of the above embodiments may be used to prepare a melt spun fiber with fiber specification ranging from about 0.5 dpf to about 4.6 dpf. In other words, the Denier per Filament (DPF) of the melt spun fiber may be about 0.5 to about 4.6.

In some embodiments, when the melt spun fiber is a pre-oriented yarn, its fiber strength is greater than or equal to about 1.5 g/d. In other embodiments, when the melt spun fiber is a pre-oriented yarn, its fiber elongation is greater than or equal to about 45%. In still other embodiments, when the melt spun fiber is a fully oriented yarn with a stretching ratio of 55%, its fiber strength is greater than or equal to about 3 g/d, and the fiber elongation is greater than or equal to about 35%. That is to say, the melt spun fiber made by using a fiber masterbatch according to any one of the above embodiments can have good mechanical properties and is suitable for making textiles.

It is worth noting that in the present embodiment, the melt spun fiber is made by the fiber masterbatch including the polyetherimide, the polyethylene terephthalate, and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP, thereby the melt spun fiber can have low processing temperature, good flexibility, good flame retardancy, good heat resistance, and no dripping phenomenon after combustion.

Features of the present invention will be more specifically described below with reference to Examples 1 to 14 and Comparative Examples 1 to 3. Although the following examples are described, the materials used, the amounts and ratios thereof, the processing details, the processing flow, and the like can be appropriately changed without departing from the scope of the invention. Therefore, the invention should not be construed restrictively by the examples described below.

Synthesis Examples 1-2

After the polyimide of Synthesis Examples 1-2 were formed according to the preparation method of the polyimide disclosed in the foregoing, the glass transition temperatures (Tg), the 10% thermogravimetric loss temperatures ($T_{d10\%}$) and the viscosities of the polyimide of each of Synthesis Examples 1-2 were respectively measured. The description of the aforementioned measurements is as follows, and the measurement results are shown in Table 1.

<Measurement of Glass Transition Temperature (Tg)>

The glass transition temperature (° C.) of the polyimide of each of Synthesis Examples 1-2 was measured under a nitrogen atmosphere at a heating rate of 10° C./min by using a thermomechanical analyzer (manufactured by Maia Co., Ltd., model: DSC200 F3).

<Measurement of 10% Thermogravimetric Loss Temperature ($T_{d10\%}$)>

The polyimide of each of Synthesis Examples 1-2 was measured under a nitrogen atmosphere at a heating rate of 20° C./min by using a thermogravimetric analyzer (manufactured by TA Instruments, model: Q50), and the change in weight of each polyimide was recorded, where the temperature measured when each polyimide lost 10% by weight was the 10% thermogravimetric loss temperature (° C.).

<Measurement of Viscosity>

Firstly, the polyimide of each of Synthesis Examples 1-2 was dissolved in the solvent NMP to form a sample solution with a solid content of 15 wt %. Next, the viscosity (cP) of each sample solution was measured at room temperature by using a rotary viscometer (manufactured by Brookfield Co., Ltd., model: DV-II+ Pro Viscometer).

TABLE 1

|  | Tg (° C.) | $T_{d10\%}$ (° C.) | Viscosity (cP) |
| --- | --- | --- | --- |
| Synthesis Example 1 | 141 | 509 | 81 |
| Synthesis Example 2 | 168 | 549 | 228 |

Example 1

The fiber masterbatch of Example 1 was prepared by the following steps. A mixing and dispersion process was performed on 27 parts by weight of polyetherimide (ULTEM 1010 PEI manufactured by Sabic), 70 parts by weight of polyethylene terephthalate (PET 3802 manufactured by NAN YA PLASTIC Co., Ltd.), and 3 parts by weight of the polyimide of Synthesis Example 1 placed in a high-speed mixer (manufactured by AVALONG Machinery Co., Ltd., model: FC-25) for 3 minutes to form a powder composition. Next, a blending and granulating process was performed on the powder composition placed in a twin-screw extruder at 340° C. and a rotation speed of 850 rpm to obtain the fiber masterbatch of Example 1.

Example 2 to Example 8

The fiber masterbatches of Examples 2 to 8 were prepared by the same steps as in Example 1, and the difference lies in: the kind of the polyimide, and/or the usage amount of the polyetherimide, the polyethylene terephthalate and the polyimide (as shown in Table 2).

TABLE 2

|  | The usage amount of polyetherimide | The usage amount of polyethylene terephthalate | Polyimide Kind | Usage amount |
| --- | --- | --- | --- | --- |
| Example 1 | 27 parts by weight | 70 parts by weight | Synthesis Example 1 | 3 parts by weight |
| Example 2 | 36 parts by weight | 60 parts by weight | Synthesis Example 1 | 4 parts by weight |
| Example 3 | 70 parts by weight | 30 parts by weight | Synthesis Example 1 | 1 part by weight |
| Example 4 | 80 parts by weight | 20 parts by weight | Synthesis Example 1 | 1 part by weight |
| Example 5 | 80 parts by weight | 20 parts by weight | Synthesis Example 1 | 1.5 parts by weight |
| Example 6 | 80 parts by weight | 20 parts by weight | Synthesis Example 1 | 2 parts by weight |
| Example 7 | 47.5 parts by weight | 50 parts by weight | Synthesis Example 2 | 2.5 parts by weight |
| Example 8 | 66.5 parts by weight | 30 parts by weight | Synthesis Example 2 | 3.5 parts by weight |

Comparative Example 1

In Comparative Example 1, no other polymers were mixed with the polyetherimide (ULTEM 1010 PEI manufactured by Sabic). In other words, the commercially available polyetherimide ULTEM 1010 PEI was directly used for granulation in Comparative Example 1.

Comparative Example 2

In Comparative Example 2, no other polymers were mixed with the polyethylene terephthalate (PET 3802 manufactured by NAN YA PLASTIC Co., Ltd.). In other words, the commercially available polyethylene terephthalate PET 3802 was directly used for granulation in Comparative Example 2.

Comparative Example 3

The fiber masterbatch of Comparative Example 3 was prepared by the following steps. A mixing and dispersion process was performed on 40 parts by weight of polyetherimide (ULTEM 1010 PEI manufactured by Sabic) and 60 parts by weight of polyethylene terephthalate (PET 3802 manufactured by NAN YA PLASTIC Co., Ltd.) placed in a high-speed mixer (manufactured by AVALONG Machinery Co., Ltd., model: FC-25) for 3 minutes to form a powder composition. Next, a blending and granulating process was performed on the powder composition placed in a twin-screw extruder at 340° C. and a rotation speed of 850 rpm to obtain the fiber masterbatch of Comparative Example 3. In other words, the polyimide was not be used in Comparative Example 3.

After that, the glass transition temperatures (Tg), the crystallization temperature (Tc), the melting point (Tm), and the melt index (MI) of the fiber masterbatches of Examples 1 to 8, the fiber masterbatch of Comparative Example 1 (i.e., ULTEM 1010 PEI), the fiber masterbatch of Comparative Example 2 (i.e., PET 3802), and the fiber masterbatch of Comparative Example 3 were respectively measured, and the crystallization behavior, the surface morphology and the dripping phenomenon of the fiber masterbatches of Examples 1 to 8, the fiber masterbatch of Comparative Example 1 (i.e., ULTEM 1010 PEI), the fiber masterbatch of Comparative Example 2 (i.e., PET 3802), and the fiber masterbatch of Comparative Example 3 were respectively evaluated. The description of the aforementioned items is as follows, and the measurement results and the evaluation results are shown in Table 3.

<Measurement of Thermal Properties>

The fiber masterbatches of Examples 1-8, the fiber masterbatch of Comparative Example 1 (i.e., ULTEM 1010 PEI), the fiber masterbatch of Comparative Example 2 (i.e., PET 3802), and the fiber masterbatch of Comparative Example 3 were pressed into sheets respectively. Next, the glass transition temperatures (° C.) of these sheets were respectively measured under a nitrogen atmosphere at a heating rate of 10° C./min by using a thermomechanical analyzer (manufactured by Maia Co., Ltd., model: DSC200 F3). In addition, the melting point (° C.) and the crystallization temperature (° C.) of each of the above fiber masterbatches were obtained by the heating curve and the cooling curve.

<Measurement of Melt Index (MI)>

The melt indexes (g/10 min) of the fiber masterbatches of Examples 1-8, the fiber masterbatch of Comparative Example 1 (i.e., ULTEM 1010 PEI), the fiber masterbatch of Comparative Example 2 (i.e., PET 3802), and the fiber masterbatch of Comparative Example 3 were respectively measured according to ASTM D-1238, where the loaded weight used in the measurements of the fiber masterbatches of Examples 1-8, Comparative Example 1, Comparative Example 2 and Comparative Example 3 was 5 kg, and the testing temperature varies depending on the tested samples used. Please refer to Table 2 for the detailed testing temperature. In general, the higher the melt index is, the better the melt processability is and the better the hot fluidity is.

<Judgment of Crystallization Behavior>

The crystallization behavior of the fiber masterbatch of each of Examples 1-8, Comparative Example 1, Comparative Example 2 and Comparative Example 3 was judged from the measurement results of the above thermal properties. In detail, a fiber masterbatch with a melting point means that it has a polymer crystallization behavior.

<Judgment of Surface Morphology>

The appearance of the crystalline fiber masterbatch is opaque, by which the surface morphology of the fiber masterbatch of each of Examples 1-8, Comparative Example 1, Comparative Example 2 and Comparative Example 3 can be judged.

<Evaluation of Dripping Phenomenon>

The fiber masterbatches of Examples 1-8, the fiber masterbatch of Comparative Example 1 (i.e., ULTEM 1010 PEI), the fiber masterbatch of Comparative Example 2 (i.e., PET 3802), and the fiber masterbatch of Comparative Example 3 were pressed into sheets respectively. After burning the sheets, it was visually observed whether the fiber masterbatch of each of Examples 1-8, Comparative Example 1, Comparative Example 2, and Comparative Example 3 has dripping phenomenon. The evaluation results are shown in Table 3 below.

TABLE 3

| | Tg (° C.) | Tc (° C.) | Tm (° C.) | Crystallization behavior | Surface morphology |
|---|---|---|---|---|---|
| Example 1 | 101 | 160 | 252 | crystallization | Haze |
| Example 2 | 100 | 188 | 250 | crystallization | Haze |
| Example 3 | 151 | N/A | N/A | Amorphous | Transparent |
| Example 4 | 165 | N/A | N/A | Amorphous | Transparent |
| Example 5 | 168 | N/A | N/A | Amorphous | Transparent |
| Example 6 | 170 | N/A | N/A | Amorphous | Transparent |
| Example 7 | 131 | N/A | 240 | crystallization | Transparent |
| Example 8 | 156 | N/A | N/A | Amorphous | Transparent |
| Comparative Example 1 | 214 | N/A | N/A | Amorphous | Transparent |
| Comparative Example 2 | 80 | N/A | 251.8 | crystallization | Haze |
| Comparative Example 3 | 94 | N/A | 253 | crystallization | Semi-hazed |

| | MI (g/10 min)/ Test Temperature (° C.) | Dripping or not |
|---|---|---|
| Example 1 | 191/300 | No |
| Example 2 | 148/300 | No |
| Example 3 | 146/320 | No |
| Example 4 | 74/320 | No |
| Example 5 | 77/320 | No |
| Example 6 | 78/320 | No |
| Example 7 | 195/300 | No |
| Example 8 | 51/300 | No |
| Comparative Example 1 | 13/340 | No |
| Comparative Example 2 | 511/300 | Yes |
| Comparative Example 3 | N/A | Yes |

It can be seen from the above Table 3 that compared with ULTEM 1010 PEI of Comparative Example 1, the fiber masterbatch of each of Examples 1-8 has reduced glass transition temperature. The results show that, compared with the polyetherimide not mixed with other polymers, the fiber masterbatch of the present invention including the polyetherimide, the polyethylene terephthalate, and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP has reduced glass transition temperature and good flexibility.

It can be seen from the above Table 3 that compared with the melt index and the melt processing temperature of ULTEM 1010 PEI of Comparative Example 1, the fiber masterbatch of each of Examples 1-8 has good fluidity at lower melt processing temperature. The results show that the fiber masterbatch of the present invention including the polyetherimide, the polyethylene terephthalate and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP has good melt processability, good hot fluidity and reduced melt processing temperature.

It can be seen from the above Table 3 that compared to the PET3802 of Comparative Example 2 and the fiber masterbatch without adding polyimide of Comparative Example 3, the fiber masterbatches of Examples 1-8, and ULTEM 1010 PEI of Comparative Example 1 have no dripping phenomenon after combustion. It is worth mentioning that the fiber masterbatch of Example 2 and the fiber masterbatch of Comparative Example 3 have similar proportions of the polyetherimide and the polyethylene terephthalate, but the fiber masterbatch of Example 2 has no dripping phenomenon after combustion, while the fiber masterbatch of Comparative Example 3 has dripping phenomenon after combustion. The results show that by adding the polyimide, the mixture of the polyetherimide and the polyethylene terephthalate can be effectively prevented from having dripping phenomenon after combustion, and can have similar flame retardancy to pure polyetherimide. In this way, the fiber masterbatch of the present invention including the polyetherimide, the polyethylene terephthalate, and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP has good flame retardant effect and no dripping phenomenon.

In addition, after the fiber masterbatches of Example 2 and Examples 4-6 were manufactured, these fiber masterbatches were subjected to a melt-spinning process to produce melt spun fibers of Example 9-14.

Example 9

First, the fiber masterbatch of Example 2 was dried at 140° C. for 12 hours to remove moisture. Next, the dried fiber masterbatch of Example 2 was melt spun at a melt-spinning temperature of 320° C. and a winding speed of 800 m/min to obtain the melt spun fiber of Example 9 (i.e., pre-oriented yarn). The fiber specification of the melt spun fiber of Example 9 is shown in Table 4.

Example 10

First, the fiber masterbatch of Example 4 was dried at 140° C. for 12 hours to remove moisture. Next, the dried fiber masterbatch of Example 4 was melt spun at a melt-spinning temperature of 345° C. and a winding speed of 1000 m/min to obtain the melt spun fiber of Example 10 (i.e., pre-oriented yarn). The fiber specification of the melt spun fiber of Example 10 is shown in Table 4.

Example 11

First, the fiber masterbatch of Example 5 was dried at 140° C. for 12 hours to remove moisture. Next, the dried fiber masterbatch of Example 5 was melt spun at a melt-spinning temperature of 345° C. and a winding speed of 800 m/min to obtain the melt spun fiber of Example 11 (i.e., pre-oriented yarn). The fiber specification of the melt spun fiber of Example 11 is shown in Table 4.

Example 12

First, the fiber masterbatch of Example 6 was dried at 140° C. for 12 hours to remove moisture. Next, the dried fiber masterbatch of Example 6 was melt spun at a melt-spinning temperature of 345° C. and a winding speed of 1000 m/min to obtain the melt spun fiber of Example 12 (i.e., pre-oriented yarn). The fiber specification of the melt spun fiber of Example 12 is shown in Table 4.

Example 13

First, the fiber masterbatch of Example 6 was dried at 140° C. for 12 hours to remove moisture. Next, the dried fiber masterbatch of Example 6 was melt spun at a melt-spinning temperature of 345° C. and a winding speed of 800 m/min to obtain the melt spun fiber of Example 13 (i.e., pre-oriented yarn). The fiber specification of the melt spun fiber of Example 13 is shown in Table 4.

Example 14

The melt spun fiber of Example 13 was subjected to a thermal stretching process at a stretching temperature of 70° C. by using a thermal stretching braiding machine to obtain the melt spun fiber of Example 14 (i.e., fully oriented yarn) with a stretching ratio of 55%. The fiber specification of the melt spun fiber of Example 14 is shown in Table 4.

Afterwards, the fiber specification, the fiber strength and fiber elongation of the melt spun fibers of Examples 9-14 were respectively measured, and the melt spun fibers of Examples 9-14 were evaluated for the dripping phenomenon. The description of the aforementioned items is as follows, and the measurement results and the evaluation results are shown in Table 4.

<Measurement of Fiber Strength and Fiber Elongation>

The melt spun fibers of Examples 9-14 were respectively fixed with a spacing of 25 cm, and the fiber strength (g/d) and the fiber elongation (%) of the melt spun fiber of each of Examples 9-14 were respectively measured at a drawing speed of 125 cm per minute, a drawing strength of 100 Newtons (N), a relative humidity of 65% and temperature of 23° C. by using a yarn tensile tester (model: STATIMAT C, manufactured by TEXTECHNO Co., Ltd.).

<Evaluation of Dripping Phenomenon>

After burning the melt spun fiber of each of Examples 9-14, it was visually observed whether the melt spun fiber of each of Examples 9-14 has dripping phenomenon. The evaluation results are shown in Table 4 below.

TABLE 4

|  | Specification of Fiber(DPF) | Fiber strength (g/d) | Fiber elongation (%) | Dripping or not |
| --- | --- | --- | --- | --- |
| Example 9 | 307d/96f | 0.6 | 2.9 | No |
| Example 10 | 115d/96f | 1.6 | 47.0 | No |
| Example 11 | 200d/48f | 1.6 | 50.2 | No |
| Example 12 | 159d/48f | 1.7 | 53.2 | No |
| Example 13 | 211d/48f | 1.5 | 63.8 | No |
| Example 14 | 2.4dpf | 3.0 | 35.4 | No |

It can be seen from the above Table 4 that by using the fiber masterbatches of Examples 2 and 4-6 for spinning at melt-spinning temperature of 320° C. to 345° C., the melt spun fibers with good mechanical properties can be prepared. The results show that compared with the commercially available polyetherimide melt spun fiber (for example: a processing temperature of KURAKISSS™ manufactured by Kuraray Co., Ltd. is up to 390° C.), the melt spun fiber of the present invention obtained by the fiber masterbatch including the polyetherimide, the polyethylene terephthalate, and the polyimide of which the glass transition temperature is between 140° C. and 170° C., the 10% thermogravimetric loss temperature is between 500° C. and 550°

C., and when the polyimide is dissolved in NMP and the solid content is 15 wt %, the viscosity is between 80 cP and 230 cP can be manufactured at the lower processing temperature that can be achieved by the general machine. In this way, the melt spun fiber of the present invention has good applicability.

It can be seen from the above Table 4 that the melt spun fibers of Examples 9-14 have no dripping phenomenon after combustion. The results show that the melt spun fiber of the present invention obtained by the fiber masterbatch including the polyetherimide, the polyethylene terephthalate, and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP has good flame retardant effect and no dripping phenomenon.

It can be seen from the above Table 4 that the thermal stretched melt spun fiber of Example 14 has good mechanical properties and finer fiber specification. This result shows that by using the fiber masterbatch including the polyetherimide, the polyethylene terephthalate, and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP, the melt spun fiber of the present invention can be made into a melt spun fiber with good mechanical properties and further refined fiber specification through a thermal stretching process. In other words, according to the different process conditions (for example: winding speed, stretching temperature, stretching ratio), the fiber masterbatch of the present invention including the polyetherimide, the polyethylene terephthalate, and the polyimide of which the glass transition temperature is between 140° C. and 170° C., the 10% thermogravimetric loss temperature is between 500° C. and 550° C., and when the polyimide is dissolved in NMP and the solid content is 15 wt %, the viscosity is between 80 cP and 230 cP can be used to produce melt spun fibers of various fiber specifications with mechanical properties controlled within the ideal ranges. In this way, the melt spun fiber of the present invention has a wide range of product applicability.

Although the present invention is disclosed with reference to embodiments above, the embodiments are not intended to limit the present invention. Any person of ordinary skill in the art may make some variations and modifications without departing from the spirit and scope of the invention, and therefore, the protection scope of the present invention should be defined in the following claims.

What is claimed is:

1. A fiber masterbatch, comprising:
   a polyetherimide;
   a polyethylene terephthalate; and
   a polyimide, wherein a glass transition temperature of the polyimide is between 140° C. and 170° C., a 10% thermogravimetric loss temperature of the polyimide is between 500° C. and 550° C., and when the polyimide is dissolved in N-methyl-2-pyrrolidone and has a solid content of 15 wt %, a viscosity of the polyimide is between 80 cP and 230 cP.

2. The fiber masterbatch according to claim 1, wherein a content of the polyetherimide is greater than or equal to 25 parts by weight and less than or equal to 80 parts by weight relative to 100 parts by weight of the fiber masterbatch.

3. The fiber masterbatch according to claim 1, wherein a content of the polyethylene terephthalate is greater than or equal to 20 parts by weight and less than or equal to 70 parts by weight relative to 100 parts by weight of the fiber masterbatch.

4. The fiber masterbatch according to claim 1, wherein a content of the polyimide is 1 part by weight to 5 parts by weight relative to 100 parts by weight of the fiber masterbatch.

5. The fiber masterbatch according to claim 1, wherein a melt index (MI) of the fiber masterbatch is from 70 g/10 min to 150 g/10 min at 320° C.

6. A melt spun fiber obtained by using the fiber masterbatch according to claim 1.

7. The melt spun fiber according to claim 6, wherein a fiber fineness of the melt spun fiber is between 50 d/96 f and 220 d/48 f.

8. The melt spun fiber according to claim 6, wherein when the melt spun fiber is a pre-oriented yarn (POY), a fiber strength of the melt spun fiber is greater than or equal to 1.5 g/d.

9. The melt spun fiber according to claim 6, wherein when the melt spun fiber is a pre-oriented yarn (POY), a fiber elongation of the melt spun fiber is greater than or equal to 45%.

10. The melt spun fiber according to claim 6, wherein when the melt spun fiber is a fully oriented yarn (FDY) with a stretching ratio of 55%, a fiber strength of the melt spun fiber is greater than or equal to 3 g/d, and a fiber elongation of the melt spun fiber is greater than or equal to 35%.

* * * * *